(12) United States Patent
Tsukiyoshi

(10) Patent No.: US 10,355,263 B2
(45) Date of Patent: Jul. 16, 2019

(54) BATTERY TERMINAL

(71) Applicant: Sumitomo Wiring Systems, Ltd., Yokkaichi, Mie (JP)

(72) Inventor: Keiichi Tsukiyoshi, Mie (JP)

(73) Assignee: Sumitomo Wiring Systems, Ltd. (JP)

(*) Notice: Subject to any disclaimer, the term of this patent is extended or adjusted under 35 U.S.C. 154(b) by 200 days.

(21) Appl. No.: 15/294,827

(22) Filed: Oct. 17, 2016

(65) Prior Publication Data
US 2017/0125779 A1 May 4, 2017

(30) Foreign Application Priority Data
Nov. 4, 2015 (JP) .................................. 2015-216783

(51) Int. Cl.
*H01M 2/30* (2006.01)
*H01R 11/28* (2006.01)

(52) U.S. Cl.
CPC ............. *H01M 2/30* (2013.01); *H01M 2/302* (2013.01); *H01R 11/283* (2013.01)

(58) Field of Classification Search
CPC ........ H01M 2/30; H01M 2/302; H01M 2/305; H01R 11/281; H01R 11/283
See application file for complete search history.

(56) References Cited

FOREIGN PATENT DOCUMENTS

| JP | 2002-184389 | | 6/2002 |
| JP | 2003187783 A | * | 7/2003 |
| JP | 2004235135 A | * | 8/2004 |
| JP | 2015118856 A | * | 6/2015 |

OTHER PUBLICATIONS

Machine translation of Japanese Patent Publication JP 2004-235135. (Year: 2004).*
Machine translation of Japanese Patent Publication JP 2015-118856. (Year: 2015).*
Machine translation of Japanese Patent Document No. JP2003-187783A, published Jul. 4, 2003. (Year: 2003).*

* cited by examiner

*Primary Examiner* — Sarah A. Slifka
*Assistant Examiner* — Lilia Nedialkova
(74) *Attorney, Agent, or Firm* — Gerald E. Hespos; Michael J. Porco; Matthew T. Hespos

(57) ABSTRACT

A battery terminal (A) includes a lower member (11) to be fit to a battery post (P) having an axis line extending in a vertical direction while being positioned with respect to the battery post (P) and an upper member (30) arranged above the lower member (11). Two fastening pieces (36) are formed only on the upper member (30) and are deformable to be held in close contact with an outer periphery of the battery post (P). A fastening member (50) is provided for deforming the fastening pieces (36) so that the fastening pieces (36) are held in close contact with the battery post (P).

4 Claims, 16 Drawing Sheets

BATTERY TERMINAL

BACKGROUND

1. Field of the Invention

The invention relates to a battery terminal.

2. Description of the Related Art

Japanese Unexamined Patent Publication No. 2002-184389 discloses a battery terminal with a terminal main body, a bracket, a bolt and a nut. The terminal main body includes pairs of fastening pieces capable of sandwiching a battery post. Inclined surfaces formed on the bracket are held in contact with outer side edges of the pairs of fastening pieces. When the bracket is displaced by fastening the bolt and nut, the pairs of fastening pieces are brought closer by the inclined surfaces of the bracket and held in close contact with the outer peripheral surface of the battery post.

In fastening the bolt and the nut, both the fastening pieces of a lower part and those of an upper part are brought closer in the above-described battery terminal. Thus, a large operation force is necessary in fastening the bolt and the nut, causing a problem that operability in connection to the battery post is poor.

The invention was completed based on the above situation and aims to improve operability in connection to a battery post.

SUMMARY

The invention relates to a battery terminal, comprising: a first member to be fit to a battery post having an axis line while being positioned with respect to the battery post and a second member arranged adjacent to the first member. One or more fastening pieces are formed only on the second member and are deformable to be held in close contact with an outer periphery of the battery post. The battery terminal further has fastening means for deforming the one or more fastening pieces so that the one or more fastening pieces are held in close contact with the battery post.

The second member may include a conductor connecting portion for connecting an external conductor and a coupling for coupling the conductor connecting portion and one or more base ends of the fastening pieces.

The first member may be joined to the coupling with movements restricted.

The first member may be an upper member and the second member may be a lower member. The upper member may include a conductor connecting portion for connecting an external conductor and a coupling for coupling the conductor connecting portion and base ends of the fastening pieces, and the lower member may be joined to the coupling with movements restricted. According to this configuration, since the fastening pieces can be positioned with respect to the battery post, they are unlikely to be held in close contact with the battery post in a non-uniform manner in a circumferential direction. Further, the lower member and the upper member can be joined without obstructing the deformation of the fastening pieces.

The first member may be formed with a support for allowing the fastening pieces to be deformed in directions to be held in close contact with the battery post and/or supporting the fastening pieces with relative displacements substantially along the axial line restricted. According to this configuration, since fastening pieces can be deformed stably at a constant height. Thus, a connecting operation to the battery post can be performed reliably.

A supporting plate of the support may be formed with a rotation preventing portion to which the fastening means is to be fit with rotation restricted. According to this configuration, the supporting plate doubles as a base body on which the rotation preventing portion is formed. Thus, the shape of the lower member can be simplified as compared to the case where the rotation preventing portion is formed on a dedicated part different from the supporting plate.

An area of the fastening piece to be brought into contact with the outer periphery of the battery post may be formed with a peripheral wall extending substantially along the axial line (or up or down). According to this configuration, the fastening piece is unlikely to bite into the outer periphery of the battery post, and is fastened stably to the battery post in the circumferential direction.

The battery terminal may further comprise a terminal main body having the one or more fastening pieces formed thereon; and a cam member having one or more pressing surfaces capable of pressing outer side edges of the one or more fastening pieces and inclined with respect to the axis line of the battery post. The fastening means may be configured to displace the cam member substantially along the axis line with the one or more pressing surfaces substantially held in contact with one or more of the outer side edges of the fastening pieces. The fastening piece may further be formed with an arcuate surface slidable in contact with the pressing surface.

The fastening piece may include a base plate, a folded portion connected to an outer side edge of the base plate and having the arcuate surface and a reinforcing plate formed by extending the folded portion and placed on the base plate.

The battery terminal may further comprise a supporting plate formed on the terminal main body and configured to support the one or more fastening pieces. One or more lateral rotation preventing portions may extend from one or more lateral outer side edges of the supporting plate and may be configured such that the fastening means is fit thereto with rotation restricted. One or more bulges may project laterally out from areas of the one or more lateral outer side edges of the supporting plate where the rotation preventing portions are not formed and may be configured to support the one or more fastening pieces. The fastening piece may be cantilevered substantially forward and the bulge may be arranged substantially at the same position as a contact position of the fastening piece with the cam member in a front-back direction.

The battery terminal may further comprise a terminal main body. A pair of lateral fastening pieces may be formed on the terminal main body and may be deformable to be held in close contact with an outer periphery of the battery post. A cam member may be provided and may have a pair of lateral pressing surfaces capable of pressing outer side edges of the pair of fastening pieces and inclined with respect to an axis line of the battery post. A fastening member may be configured to displace the cam member along the axis line with the pressing surfaces held in contact with outer side edges of the fastening pieces. At least one inclination restricting portion may be formed on the terminal main body and may be capable of restricting lateral inclination of the cam member. The cam member may be slidable in contact with the inclination restricting portion.

Two of the inclination restricting portions may be provide to sandwich the cam member from substantially opposite lateral sides.

The battery terminal may further comprise a vertical receiving surface on the inclination restricting portion. The cam member may be slidable in contact with the vertical receiving surface and/or a vertical contact surface formed on the cam member and may be slidable in contact with the inclination restricting portion.

The battery terminal may further comprise vertical walls formed on the cam member to be connected to the pressing surfaces and slidable substantially in contact with the outer side edges of the pair of fastening pieces.

According to the above, the fastening pieces to be deformed into close contact with the outer periphery of the battery post are formed only on the upper member. Thus, an operation force required for deformation is smaller than if fastening pieces formed on both the lower and upper members are deformed. Thus, operability in connection to the battery post is excellent.

These and other features and advantages of the invention will become more apparent upon reading the following detailed description and accompanying drawings. It should be understood that even though embodiments are described separately, single features thereof may be combined to additional embodiments.

DETAILED DESCRIPTION

Figure 7:
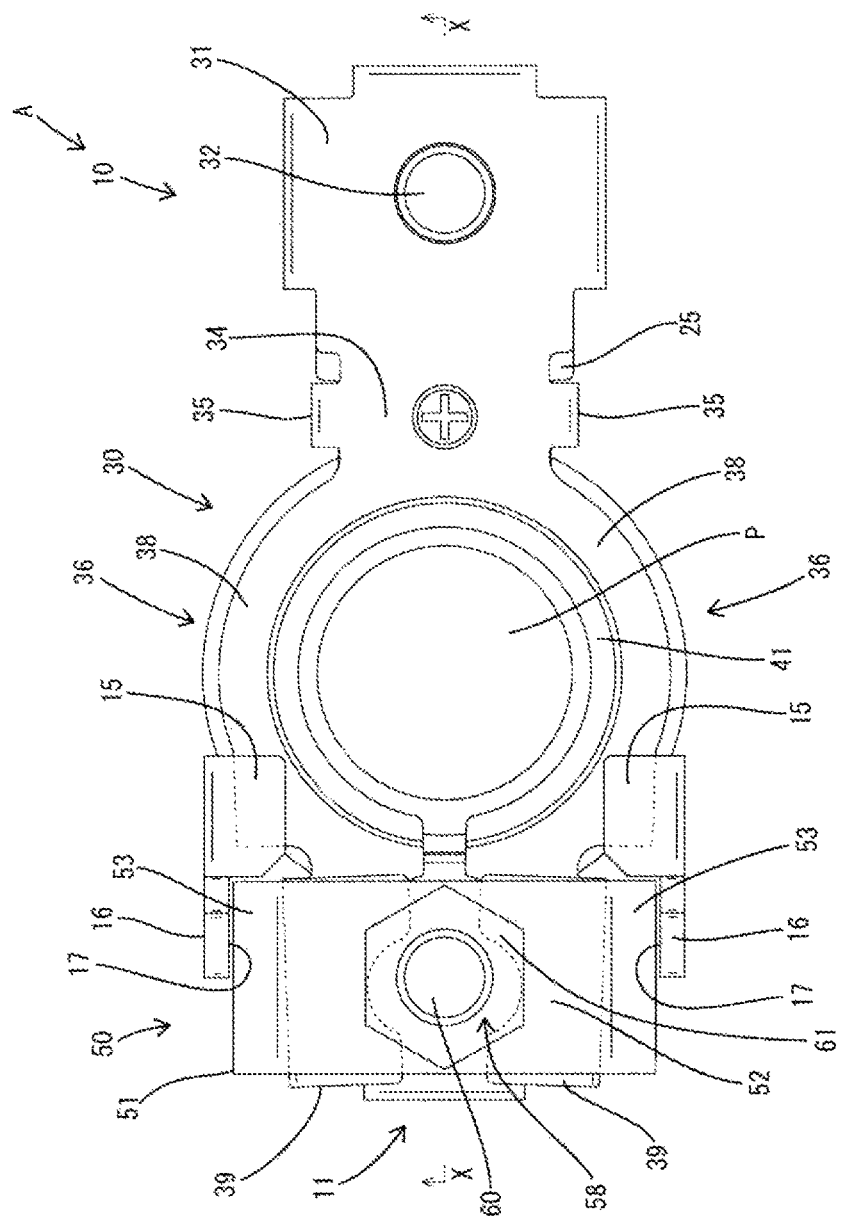
FIG. 7 is a plan view showing a state where the battery terminal is connected to a battery post.
Figure 8:
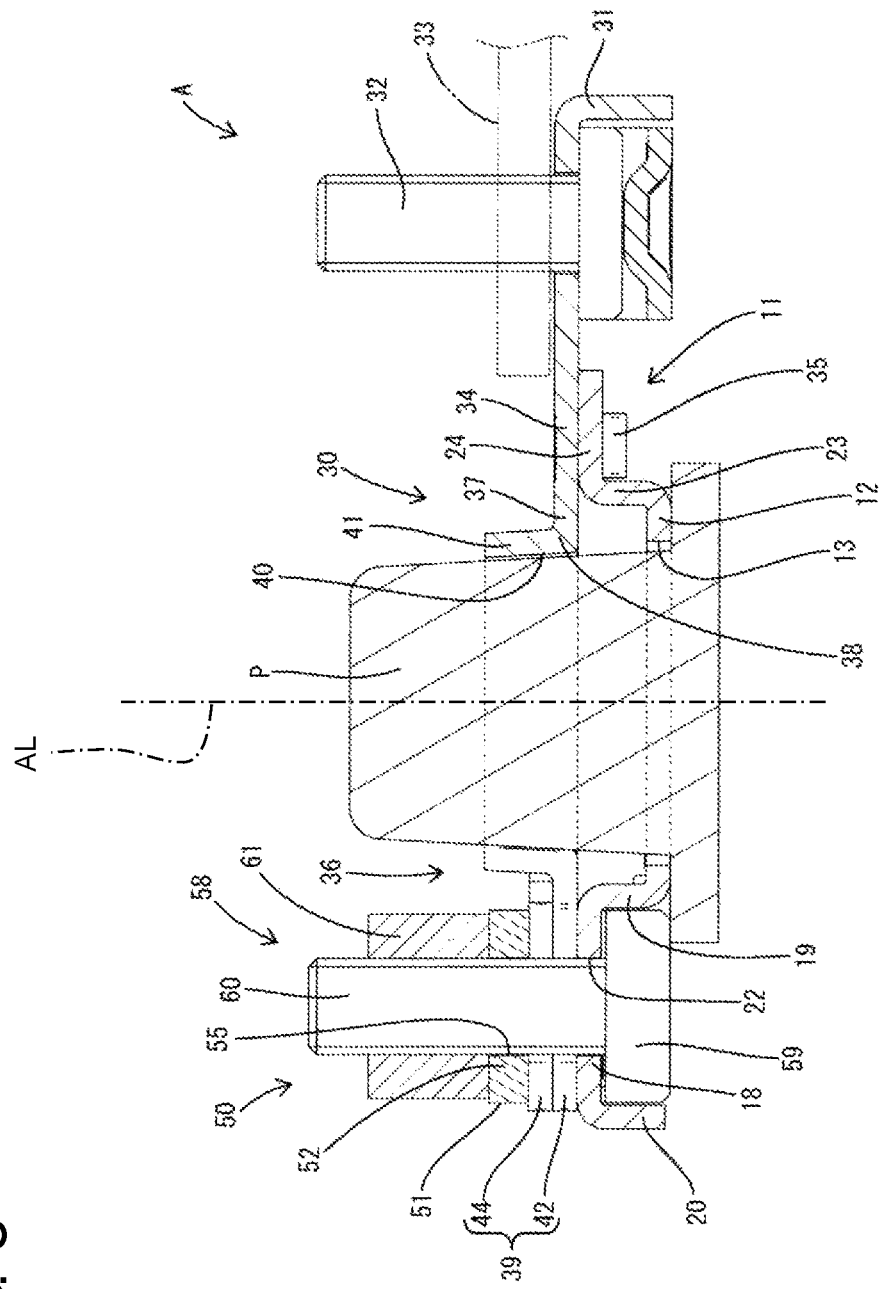
FIG. 8 is a section along X-X of FIG. 7.

A first embodiment of the present invention is described in detail with reference to FIGS. 1 to 15. As shown in FIGS. 7 and 8, a battery terminal A of this first embodiment is to be conductively connected to a battery post P having an axis line AL extending in a vertical direction. The battery terminal A includes a terminal main body 10 and a fastening means 50. The terminal main body 10 includes a lower member 11 (as a first member), an upper member 30 (as a second member) and a connection bolt 32 (as a connection member). The fastening means 50 includes a cam member 51, a fastening bolt 58 (as a fastening member) and a nut 61 (as a fastening member).

<Lower Member 11>

Figure 1:
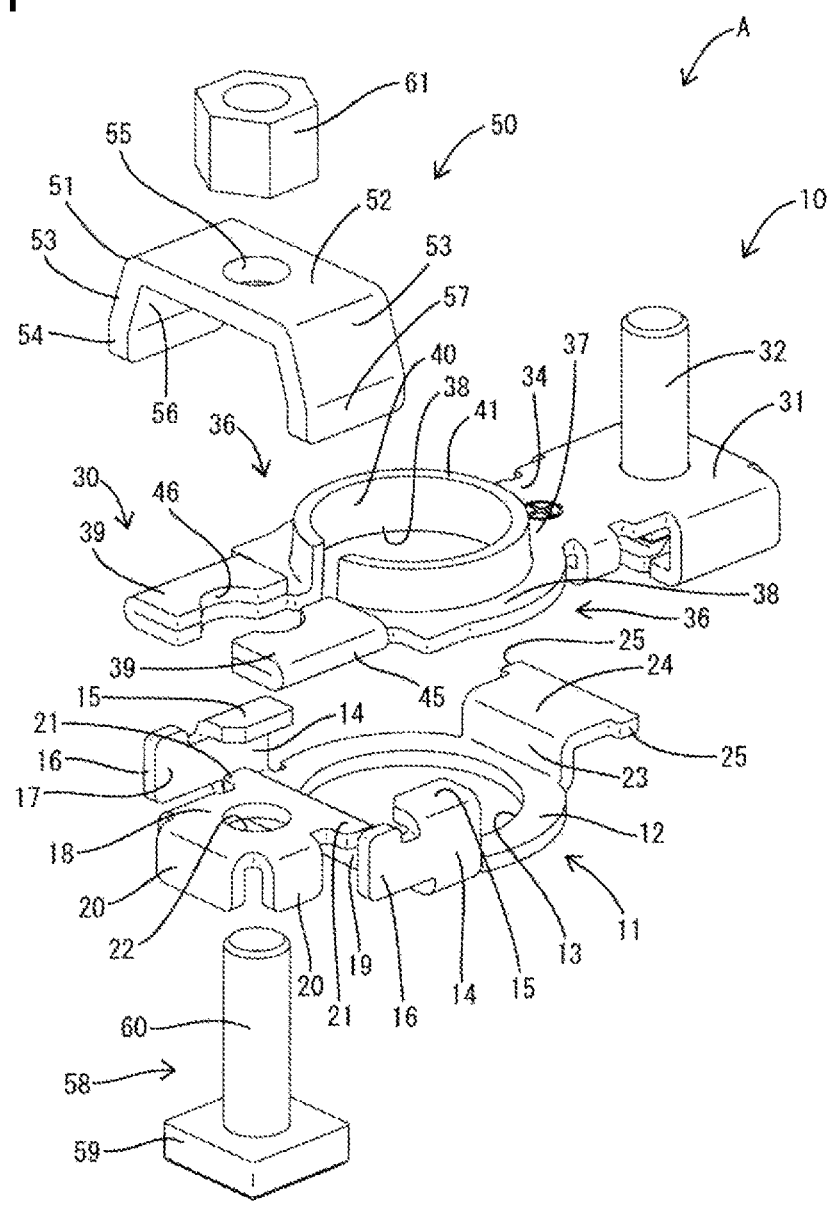
FIG. 1 is an exploded perspective view of a battery terminal of a first embodiment.
Figure 14:
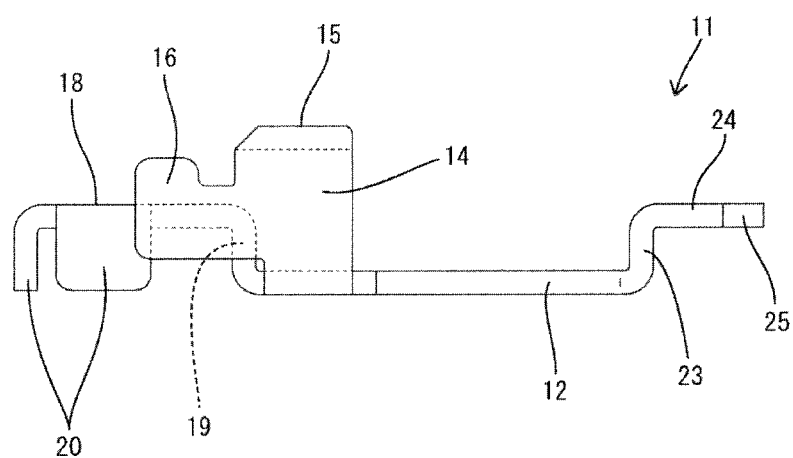
FIG. 14 is a side view of a lower member.
Figure 15:
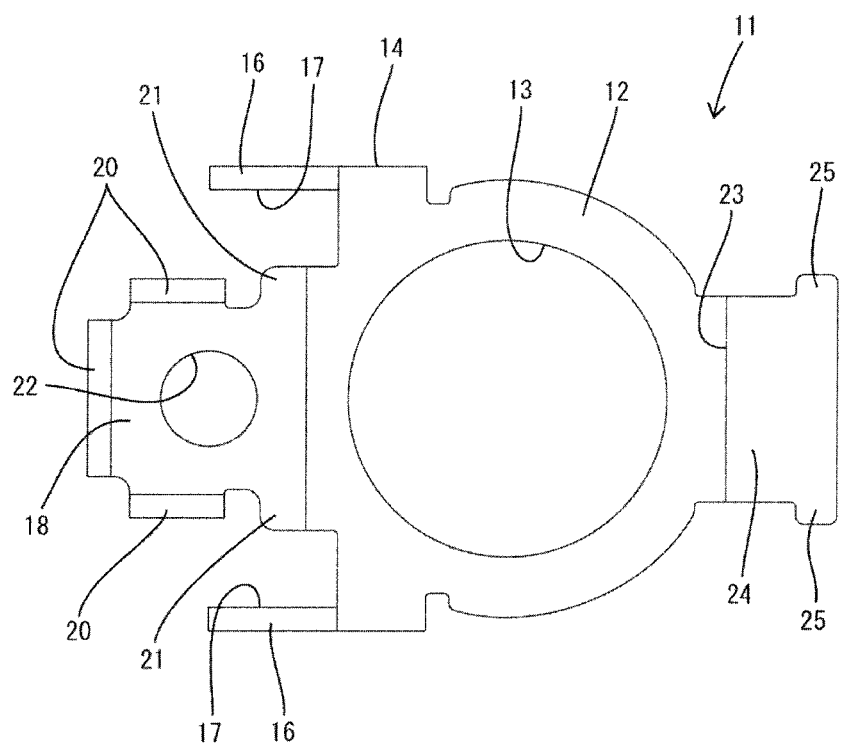
FIG. 15 is a bottom view of the lower member.

The lower member 11 is formed into a predetermined shape by applying folding, embossing and/or bending and the like to a conductive plate material particularly made of metal (e.g. iron) punched or cut out into a predetermined shape. As shown in FIGS. 1, 14 and 15, an annular portion 12 circular in a plan view is formed in a substantially central part of the lower member 11 in a front-back direction. The annular portion 12 is formed with a positioning hole 13 that is substantially circular in a plan view. An inner diameter of the positioning hole 13 is substantially equal to a maximum outer diameter of the battery post P. Two bilaterally symmetrical side walls 14 stand up on front end parts (left end parts in FIG. 9) of both left and right outer sides of the annular portion 12.

The side walls 14 are formed with two substantially horizontal and bilaterally symmetrical pressing portions 15 extending inwardly in a width direction (lateral direction) from the upper edges of the side walls 14. The pressing portions 15 function as supports for supporting fastening pieces 36. The side walls 14 are formed with plate-like and substantially bilaterally symmetrical inclination restricting portions 16 extending substantially forward from the front or distal end edges of the side walls 14 to be substantially flush with the side walls 14. The inner side surface of the inclination restricting portion 16 is a substantially flat surface extending in the vertical direction (substantially parallel to the axis line AL of the battery post P) and functions as a vertical receiving surface 17 for restricting the inclination of the cam member 51.

A supporting plate 18 is formed on a front end part of the lower member 11 and is substantially rectangular in a plan view with a substantially horizontal plate surface. The supporting plate 18 functions as a support for supporting the fastening pieces 36. The rear end edge of the supporting plate 18 is connected to the front end edge of the annular portion 12 via a front wall 19. The supporting plate 18 is formed with rotation preventing portions 20 extending down substantially at a right angle from the front end edge and both left and right side edges of the supporting plate 18. Likewise, the supporting plate 18 is formed with two plate-like and bilaterally symmetrical bulges 21 extending out in the width direction from rear end parts of both left and right side edges of the supporting plate 18 to be flush with the supporting plate 18. Further, the supporting plate 18 is formed with a through hole 22 that is circular in a plan view.

The lower member 11 is formed with a rear wall 23 extending up from the rear end edge of the annular portion 12 and a plate-like joining portion 24 extending horizontally back from the upper end edge of the rear wall 23. The plate-like joining portion 24 is formed with two bilaterally symmetrical retaining projections 25 projecting out in the width direction from rear end parts of both left and right side edge of the plate-like joining portion 24.

<Upper Member 30>

Figure 2:
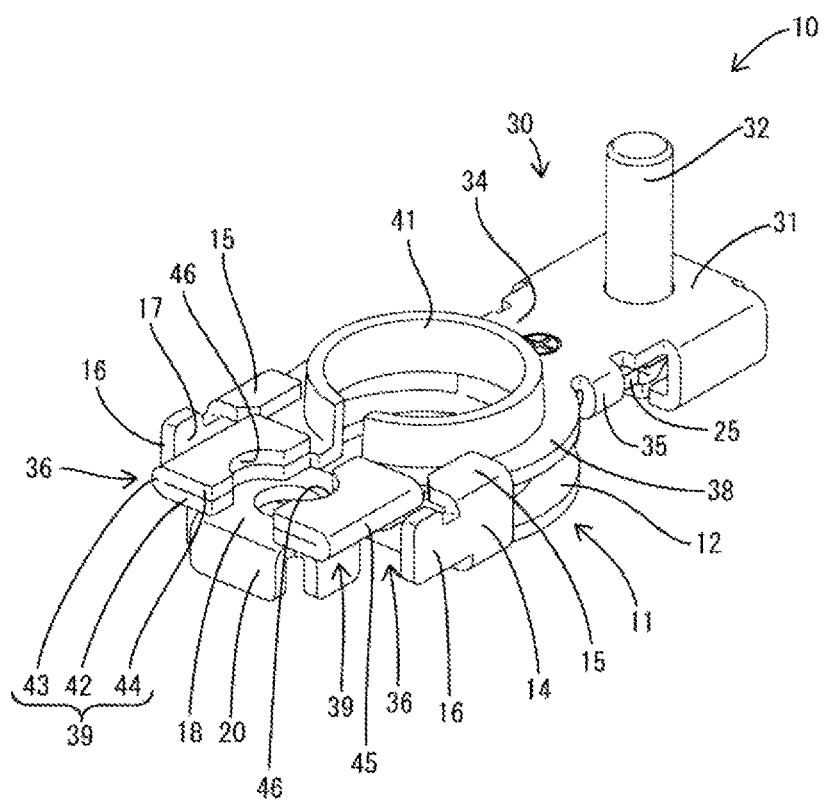
FIG. 2 is a perspective view of a terminal main body in an assembled state.
Figure 3:
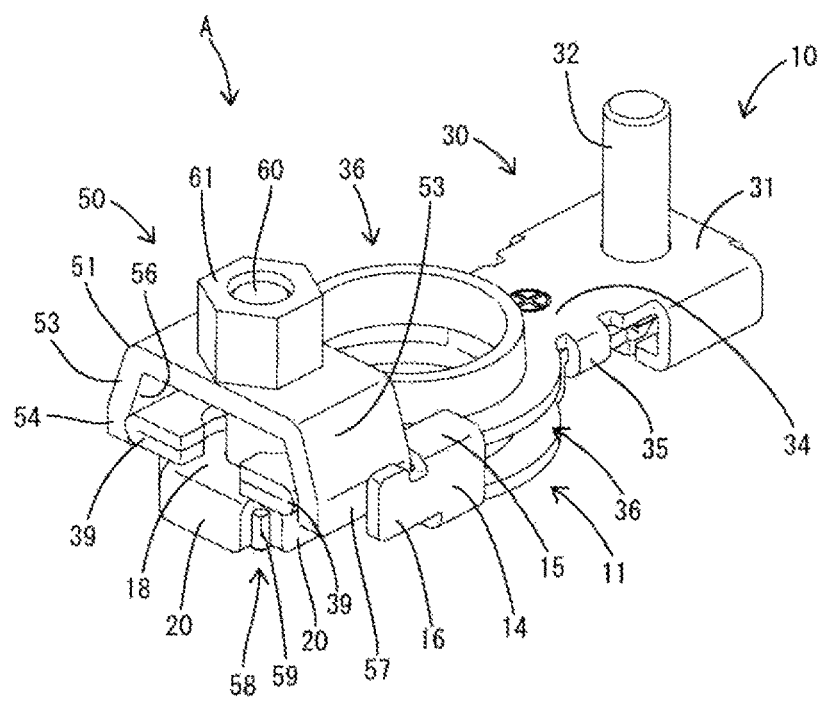
FIG. 3 is a perspective view of the battery terminal in an assembled state.

The upper member 30 is formed into a predetermined shape e.g. by applying folding, embossing and/or bending and the like to a conductive plate material made of metal (e.g. copper) punched or cut out into a predetermined shape. As shown in FIGS. 1, 2 and 8, a conductor connecting portion 31 is formed on a rear end part of the upper member 30. The conductor connecting portion 31 is formed into a substantially box shape and a base of the connection bolt 32 is accommodated in the conductor connecting portion 31. A shaft of the connection bolt 32 projects up from the conductor connecting portion 31 and an external conductor 33 is to be connected to the shaft part of this connection bolt 32.

The upper member 30 is formed with a horizontal plate-like coupling 34 extending forward from the front end edge of the conductor connecting portion 31 to be substantially flush with the conductor connecting portion 31. The coupling 34 is formed with two bilaterally symmetrical crimping pieces 35 extending down from left and right side edges of the coupling 34. This coupling 34 and the crimping pieces 35 function as a means for joining the lower member 11 and the upper member 30.

The upper member 30 is formed with two substantially bilaterally symmetrical fastening pieces 36 connected to the front end edge of the coupling 34. Both left and right fastening pieces 36 are connected to each other at base end portions 37 (rear end portions) thereof and, simultaneously, these base end portions 37 are connected to the coupling 34. The fastening piece 36 is composed of or comprises a substantially semicircular arm 38 constituting (or forming part of) a base end side area and a pressure receiving portion 39 extending forward from the front end of the arm portion 38.

The left and right arms 38 are arranged to form a substantially circular shape in a plan view and surround the battery post P to sandwich the battery post P from opposite left and right sides. A space enclosed by the left and right arms 38 serves as a connection hole 40 for accommodating the battery post P. Further, the arm 38 is formed with a peripheral wall 41 standing up from the inner side edge (inner peripheral edge) thereof by burring. With the battery terminal A connected to the battery post P, the inner side edges (inner peripheral edges) of the arms 38 and the inner peripheral surfaces of the peripheral walls 41 are held firmly in close contact with the outer periphery of the battery post P.

The pressure receiving portion 39 is composed of or comprises a horizontal base plate 42 extending forward from a front end part of the arm 38 to be flush with the arm 38, a substantially semicircular folded portion 43 extending upward from an outer widthwise edge part of the base plate 42 and a reinforcing plate 44 extending inward in the width direction from the folded portion 43 and placed on the upper surface of the base plate portion 42. Cuts 46 substantially semicircular in a plan view are formed on inner side surfaces (facing surfaces) of the both left and right pressure receiving portions 39. A radius of curvature of the cut 46 is equal to or slightly larger than that of the outer periphery of a male screw portion 60 of the fastening bolt 58 to be described later. Further, the outer surface of the folded portion 43 is formed into an arcuate surface 45 having a substantially semicircular shape in a front view. The arcuate surface 45 is connected smoothly (tangentially) to the lower surface of the base plate portion 42 and the upper surface of the reinforcing plate 44.

<Assembled Form of Lower Member 11 and Upper Member 30>

Figure 9:
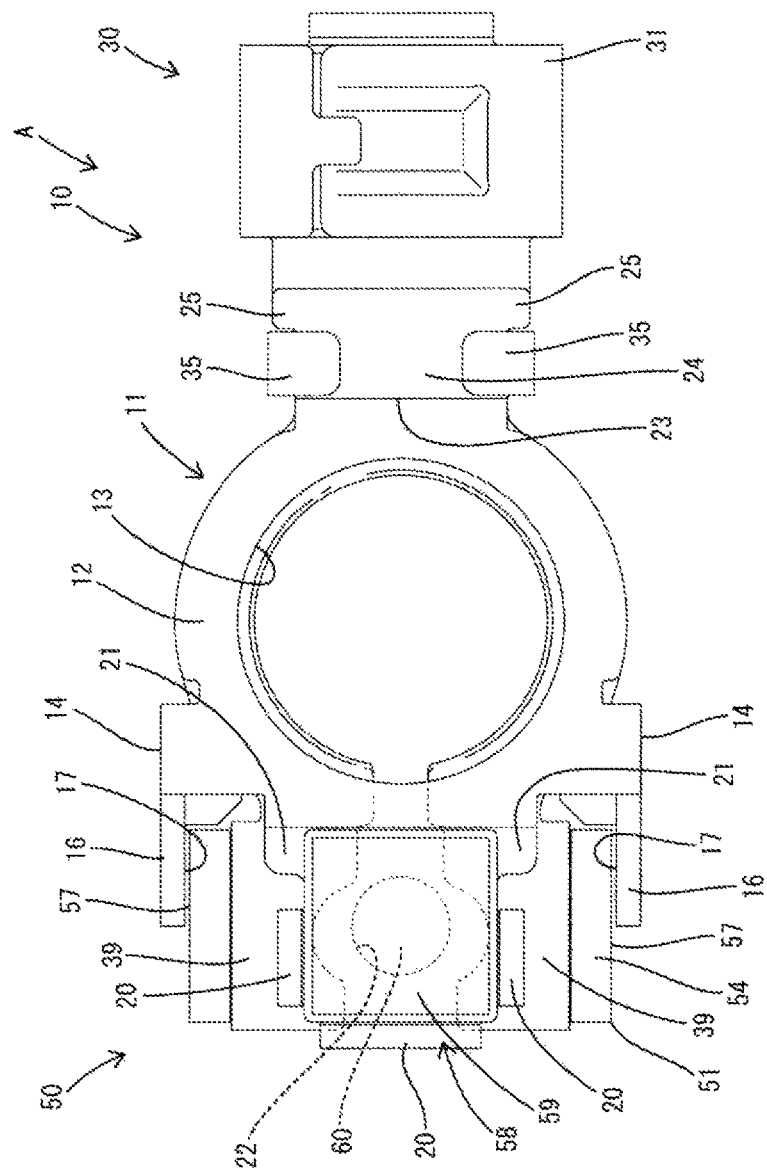
FIG. 9 is a bottom view showing the state before the fastening pieces are deformed in the fastening directions.
Figure 10:
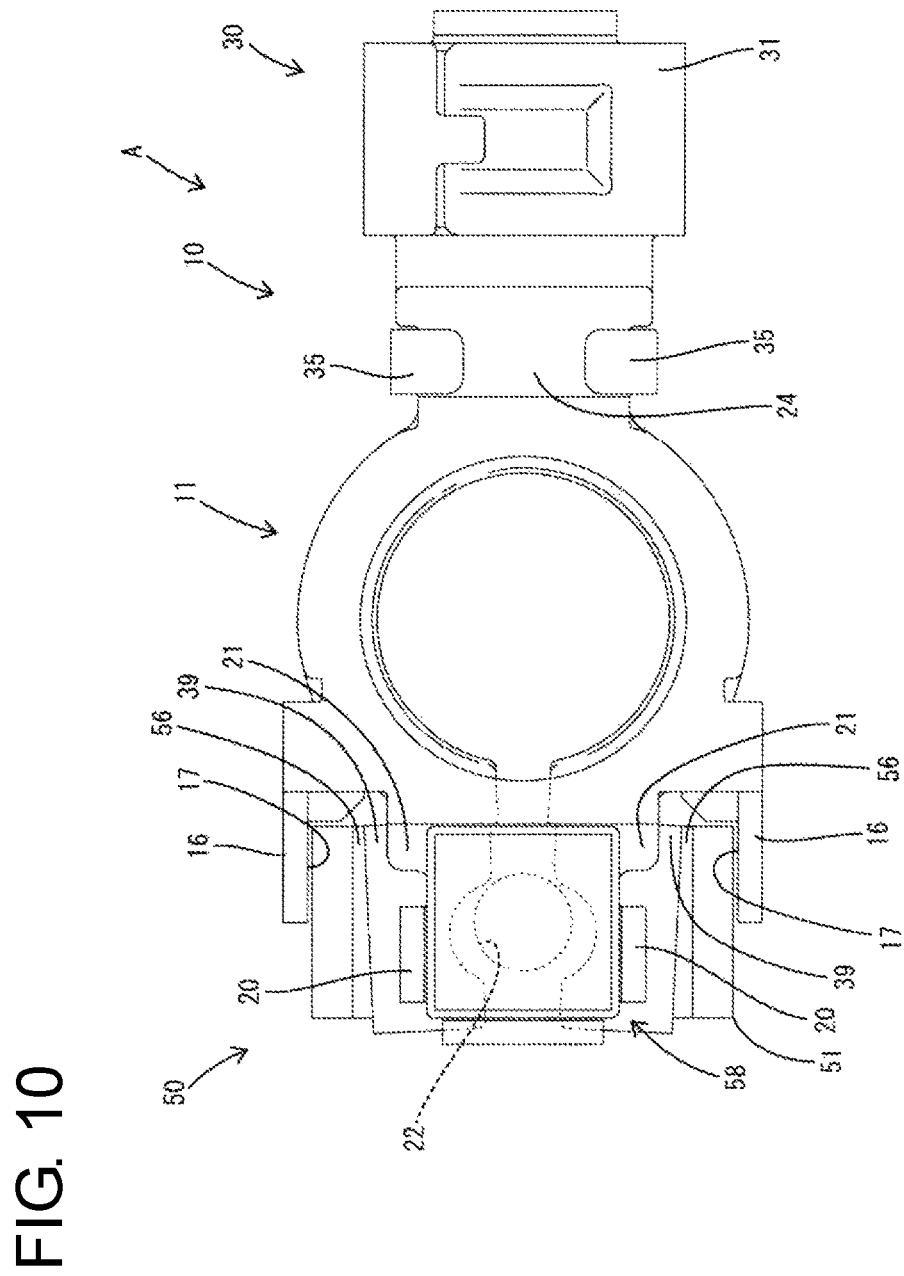
FIG. 10 is a bottom view showing the state where the fastening pieces are deformed in the fastening directions.
Figure 11:
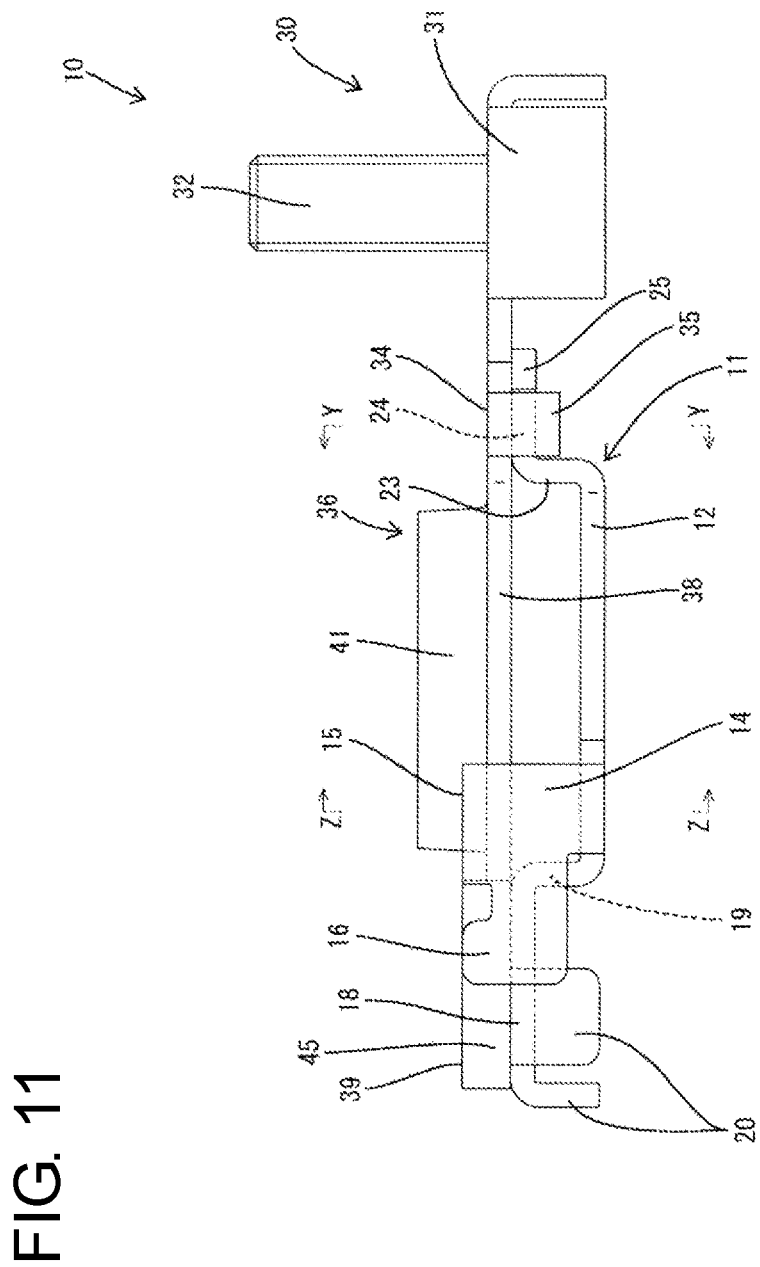
FIG. 11 is a side view of the terminal main body.
Figure 12:
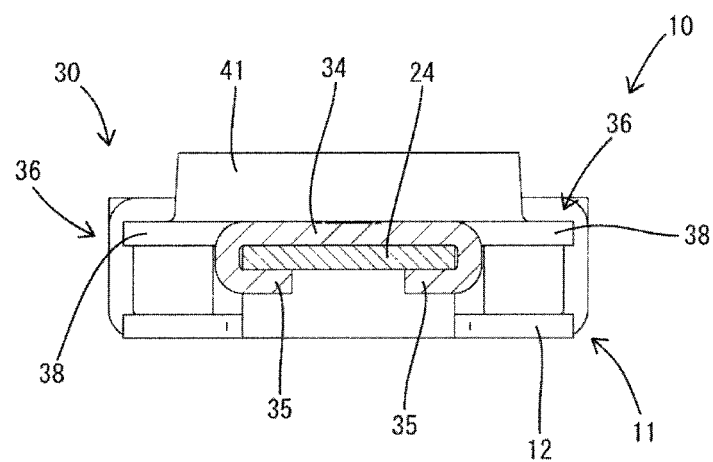
FIG. 12 is a section along Y-Y of FIG. 11.
Figure 13:
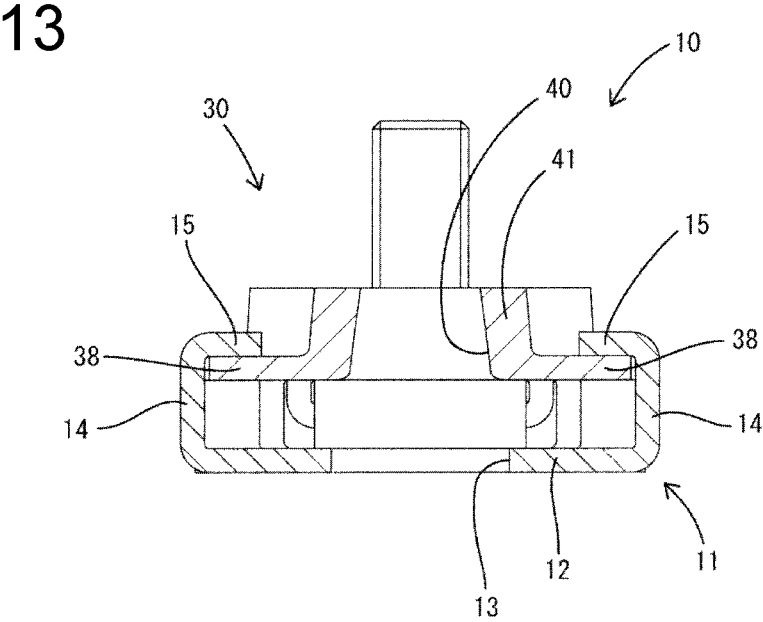
FIG. 13 is a section along Z-Z of FIG. 11.

The lower member 11 and the upper member 30 are integrally assembled such that the fastening pieces 36 are movable and deformable in the lateral direction (direction intersecting with the axis line of the battery post P) and positioned with respect to the battery post P. Specifically, as shown in FIGS. 8 and 11, the coupling 34 of the upper member 30 is placed on the upper surface of the plate-like joining portion 24 of the lower member 11 and, in this state, the pair of crimping pieces 35 are deformed to be held in close contact with the lower surface of the plate-like joining portion 24 as shown in FIGS. 9 to 12.

In this way, relative displacements of the lower member 11 and the upper member 30 in the vertical and lateral directions are restricted. Further, the deformed crimping pieces 35 are locked by being sandwiched between the rear surface of the rear wall 23 and the front surfaces of the retaining projections 25. In this way, relative displacements of the lower member 11 and the upper member 30 in the front-back direction are restricted. As just described, the plate-like joining portion 24 is joined to be vertically and firmly sandwiched between tip parts of the pair of crimping pieces 35 and the coupling 34 so that the lower member 11 and the upper member 30 are integrated. The crimping pieces 35 and the coupling 34 are joined to the plate-like joining portion 24 in areas different from the fastening pieces 36 (areas deviated back from the fastening pieces 36).

Figure 4:
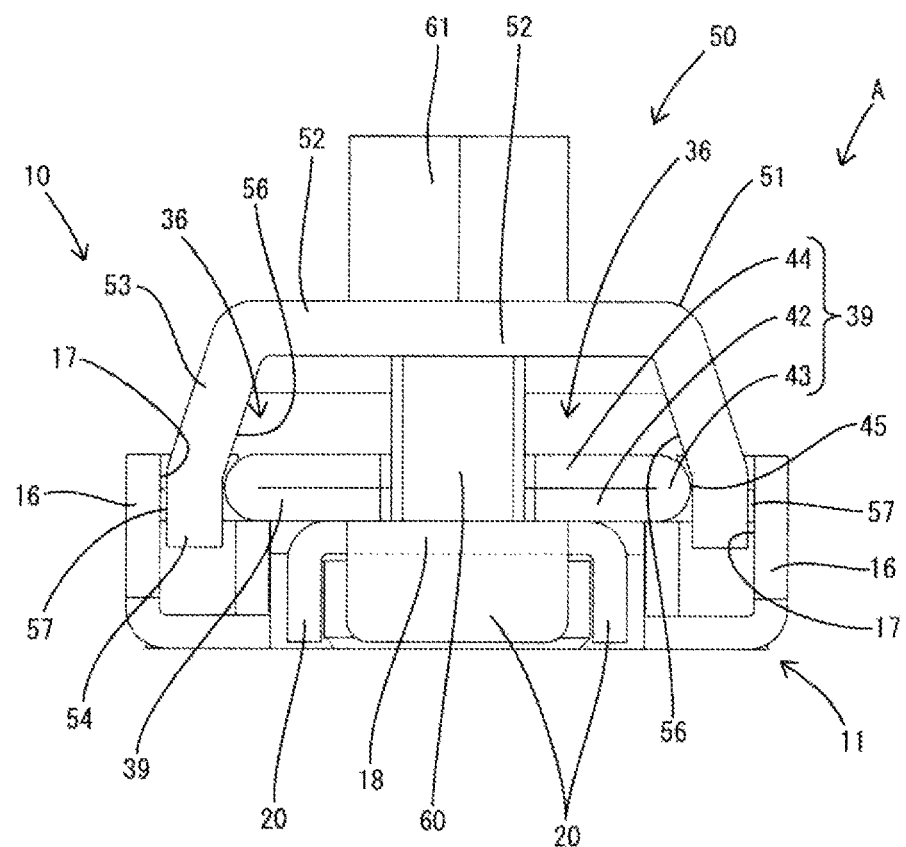
FIG. 4 is a front view showing a state before fastening pieces are deformed in fastening directions.
Figure 5:
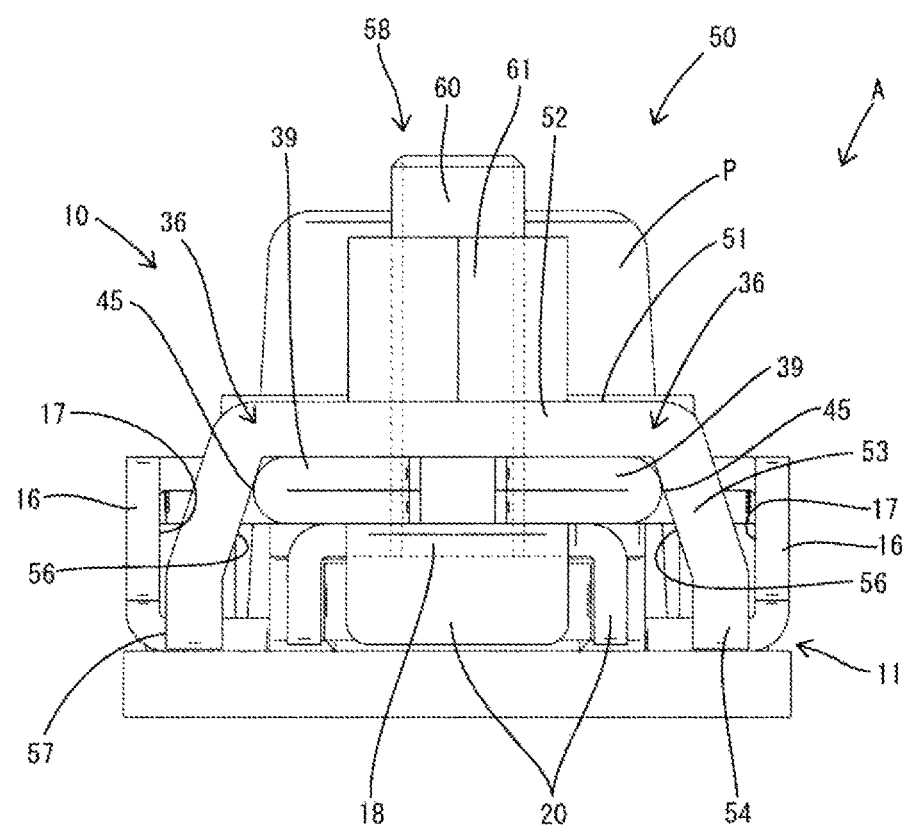
FIG. 5 is a front view showing a state where the fastening pieces are deformed in the fastening directions.
Figure 6:
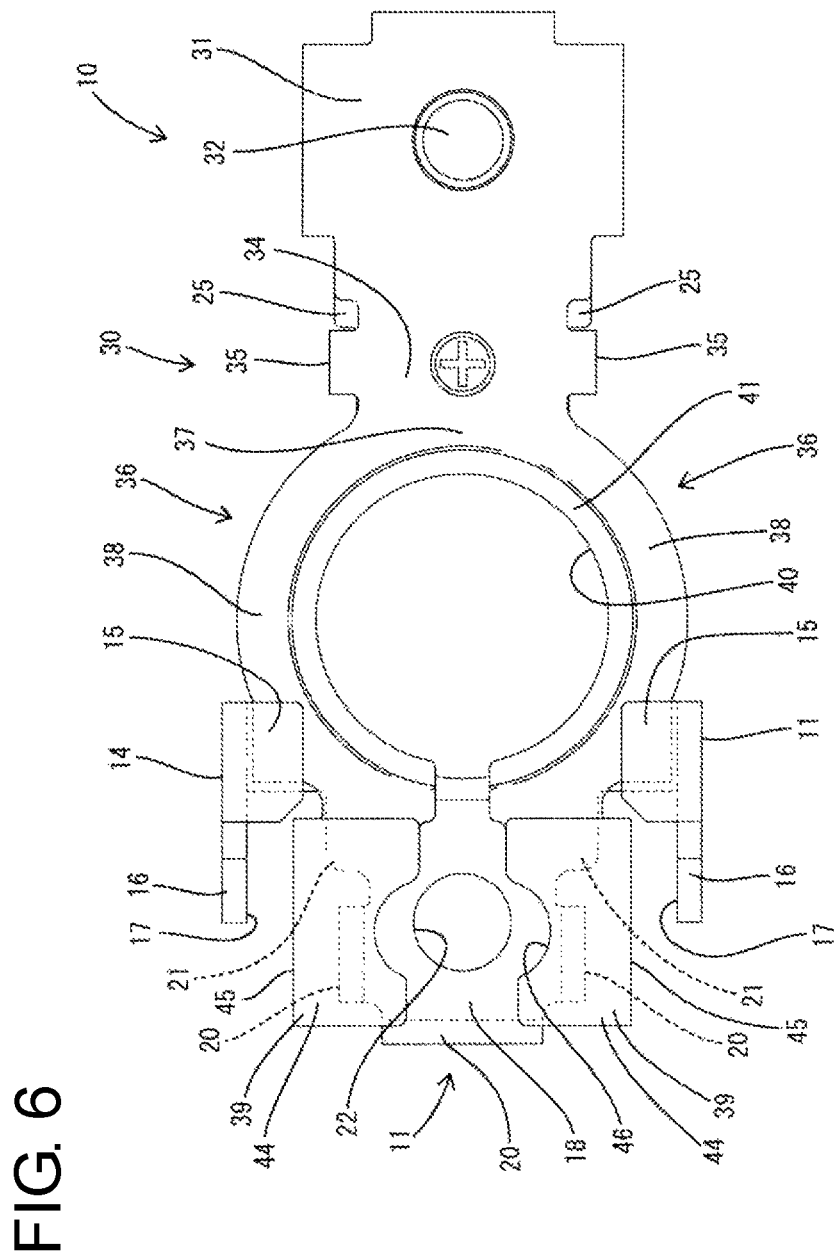
FIG. 6 is a plan view of the terminal main body.

With the lower member 11 and the upper member 30 assembled, the pressure receiving portions 39 of the pair of fastening pieces 36 are placed on the upper surface of the supporting plate 18 as shown in FIGS. 4, 5 and 8. Further, front end parts of the arms 38 of the fastening pieces 36 are held in contact with or facing the lower surfaces of the pressing portions 15 while being at a short distance from these lower surfaces. That is, the fastening pieces 36 are supported from below by the supporting plate 18 so as to be displaceable in the lateral direction with respect to the lower member 11. Further, large relative displacements of the pair of fastening pieces 36 in the vertical direction with respect to the lower member 11 are restricted by being sandwiched between the supporting plate 18 and the pressing portions 15. Further, the positioning hole 13 and the connection hole 40 between the fastening pieces 36 are positioned to be substantially coaxial in a plan view. The terminal main body 10 is configured by integrating the lower member 11 and the upper member 30 in this way.

<Fastening Means 50>

The cam member 51 constituting the fastening means 50 is formed into a predetermined shape by applying bending and the like to a metal plate material having a larger plate thickness than the lower member 11 and the upper member 30. The cam member 51 is bilaterally symmetrically shaped and composed or comprised of a horizontal portion 52 substantially rectangular in a plan view, a pair of oblique portions 53 extending obliquely downward from both left and right side edges of the horizontal portion 52 and two vertical wall portions 54 extending downward from the lower end edges of the both oblique portions 53.

The horizontal portion 52 is formed with an insertion hole 55 penetrating in the vertical direction and circular in a plan view. An inner diameter of the insertion hole 55 is set equal to or slightly larger than an outer diameter of the male screw portion 60 of the fastening bolt 58. The left and right oblique portions 53 are inclined to widen a lateral spacing toward a lower side. The inner surfaces of the left and right oblique portions 53 serve as pressing surfaces 56 inclined with respect to the vertical and lateral directions. The outer side surfaces of the vertical walls 54 serve as vertical contact surfaces 57.

The fastening bolt 58 constituting the fastening means 50 is a single part including a base portion 59 rectangular or polygonal (i.e. non-circular) in a plan view and the male screw portion 60 extending upward from the base portion 59. The nut 61 constituting or forming part of the fastening means 50 is to be screwed onto the male screw portion 60.

<Functions of First Embodiment>

The cam member 51, the fastening bolt 58 and the nut 61 are temporarily assembled with the terminal main body 10 in advance before connection to the battery post P. In temporarily assembling, the male screw portion 60 of the fastening bolt 58 is inserted into the through hole 22 from below the supporting plate portion 18 and the base 59 is brought into contact with the lower surface of the supporting plate portion 18 and fitted to the rotation preventing portions 20 as shown in FIGS. 8 and 9. In this way, the fastening bolt 58 is held with the rotation thereof with respect to the lower member 11 and the upper member 30 restricted.

The cam member 51 is mounted to cover the pair of pressure receiving portions 39 from above before or after the fastening bolt 58 is inserted through the supporting plate 18. With the cam member 51 mounted, the left and right pressure receiving portions 39 are located such that the arcuate surfaces 45 thereof face upper end parts of the inner surfaces of the vertical walls 54 and lower end parts of the pressing surfaces 56 as shown in FIG. 4. Further, the vertical walls 54 of the cam member 51 are sandwiched between the left and right inclination restricting portions 16 of the lower member 11 and the vertical contact surfaces 57 and the vertical receiving surfaces 17 are held in contact with or facing each other while being at a short distance from each other.

Further, the male screw portion 60 is inserted through the insertion hole 55 of the cam member 51 and the nut 61 is screwed onto the male screw portion 60 above the cam member 51. When the nut 61 is fastened by hand until coming into contact with the upper surface of the horizontal portion 52 of the cam member 51, the fastening means 50 is temporarily assembled with the terminal main body 10. In a temporarily assembled state, there is no backlash of the cam member 51 with respect to the terminal main body 10 since the cam member 51 is lightly pressed against the pressure receiving portions 39 (fastening pieces 36) by the fastening bolt 58 and the nut 61. Further, the posture of the cam member 51 is stabilized without being inclined to the left or right since the left and right pressure receiving portions 39 are in contact with the lower end parts of the left and right pressing surfaces 56.

The battery terminal A with the fastening means 50 temporarily assembled with the terminal main body 10 is connected or connectable to the battery post P. In connecting, the annular portion 12 and the fastening piece(s) 36 are externally fitted to the battery post P from above or substantially along the axial line AL. Then, the positioning hole 13 comes into contact with the outer periphery of the battery post P, whereby the terminal main body 10 including the fastening pieces 36 is positioned with respect to the battery post P in the horizontal direction.

Thereafter, the nut 61 is tightened using a tool. In the process of tightening the nut 61, the nut 61 displaces the cam member 51 down and, associated with this, the pair of pressing surfaces 56 press the pressure receiving portions 39 (fastening pieces 36) inwardly in the width direction (i.e. fastening directions). By this pressing action, the pair of fastening pieces 36 approach each other and the inner peripheral edges of the both arm portions 38 are held in close contact with the outer periphery of the battery post P to be fastened thereto. In the above manner, the battery terminal A is conductively connected to the battery post P.

When the fastening pieces 36 are deformed to approach each other, the left and right vertical contact surfaces 57 of the cam member 51 slide in contact with the left and right vertical receiving surfaces 17 of the lower member 11. Therefore, the posture of the cam member 51 is not inclined left or right. Since this causes the pressing surfaces 56 to press the pair of pressure receiving portions 39 equally in the lateral direction, the left and right fastening pieces 36 are deformed equally to be held in close contact with the battery post P. Further, since areas of the fastening pieces 36 to be contacted by the pressing surfaces 56 of the cam member 51 are formed into the arcuate surfaces 45 composed or comprised of curved surfaces, contact resistance between the cam member 51 and the fastening pieces 36 is suppressed to be relatively low. Further, the pressure receiving portion 39 has a high rigidity since having a double-plate structure in which the base plate 42 and the reinforcing plate 44 are placed one over the other. Thus, the pressure receiving portion 39 is not improperly deformed even if being subjected to a pressing force from the cam member 51.

Further, since improper vertical displacements and inclinations of the pair of fastening pieces 36 are restricted by the supporting plate portion 18 and the pressing portions 15, the fastening pieces 36 are deformed reliably horizontally while being kept in proper postures. Thus, the left and right fastening pieces 36 are held in close contact with the battery post P at the same height. Further, the bulges 21 extending laterally outward are formed on the both left and right side edge parts of the supporting plate portion 18 and these left and right bulges 21 also support the fastening pieces 36 from below. In addition, as shown in FIG. 10, these bulges 21 are arranged substantially at the same position as the contact positions (i.e. rear end parts of the pressure receiving portions 39) of the cam member 51 and the fastening pieces 36 in the front-back direction. Furthermore, the bulges 21 are arranged at positions near the contact positions of the cam member 51 (pressing surfaces 56) and the fastening pieces 36 (arcuate surfaces 45) in the lateral direction. Thus, pressing forces acting on the fastening pieces 36 from the cam member 51 can be reliably received by the bulges 21.

<Effects of First Embodiment>

As described above, the battery terminal A of this first embodiment includes the lower member 11 to be fitted to the battery post P having the axis line AL extending in the vertical direction while being positioned with respect to the battery post P, the upper member 30 arranged above the lower member 11 and the pair of fastening pieces 36 to be deformed to be held in close contact with the battery post P by the fastening means 50. The pair of fastening pieces 36 are formed only on the upper member 30 out of the lower member 11 and the upper member 30. Thus, as compared to the case of deforming the fastening pieces 36 formed on both the lower member 11 and the upper member 30, an operation force required to deform the battery terminal A of this embodiment can be small. Therefore, operability in connection to the battery post P is excellent.

Further, the upper member 30 includes the conductor connecting portion 31 for connecting the external conductor 33 and the coupling 34 for coupling the conductor connecting portion 31 and the base ends 37 of the fastening pieces 36. The lower member 11 is joined to the coupling 34 with movements thereof restricted. According to this configuration, the fastening pieces 36 can be positioned with respect to the battery post P, wherefore the fastening pieces 36 are not unlikely to be held in close contact with the battery post P in a non-uniform manner in a circumferential direction. Further, the lower member 11 and the upper member 30 can be joined without obstructing the deformation of the fastening pieces 36.

Further, the lower member 11 is formed with the supports (supporting plate 18 and pressing portions 15) for allowing the fastening pieces 36 to be deformed in directions to be held in close contact with the battery post P and supporting the fastening pieces 36 with vertical relative displacements restricted. According to this configuration, the connecting operation to the battery post P can be reliably performed since the pair of fastening pieces 36 can be stably deformed at a constant height. Further, the supporting plate 18 constituting the supporting portion is formed with the rotation preventing portions 20 to which the base 59 of the fastening bolt 58 constituting the fastening means 50 is to be fitted with the rotation thereof restricted. According to this configuration, since the supporting plate portion 18 doubles as a base body on which the rotation preventing portions 20 are formed, the shape of the lower member 11 can be simplified as compared to the case where the rotation preventing portions 20 are formed on a dedicated part different from the supporting plate portion 18.

Further, since the peripheral walls 41 extending up are formed in the areas of the fastening pieces 36 (inner peripheral edges of the arm portions 38) to be brought into contact with the outer periphery of the battery post P, the fastening pieces 36 (arms 38) are unlikely to bite into the outer periphery of the battery post P. Thus, the fastening pieces 36 are fastened to the battery post P stably in the circumferential direction.

Further, the battery terminal A of this first embodiment includes the terminal main body 10 and the terminal main body 10 is formed with the left and right fastening pieces 36 deformable to be held in close contact with the outer periphery of the battery post P. Further, the battery terminal A includes the cam member 51 having the left and right pressing surfaces 56 capable of pressing the outer side edges of the fastening pieces 36 (pressure receiving portions 39) and inclined with respect to the axis line of the battery post P. Furthermore, the battery terminal A also includes fastening members (fastening bolt 58 and nut 61) for displacing the cam member 51 down with the pair of pressing surfaces 56 held in contact with outer side edges of the fastening pieces 36.

The terminal main body 10 has the inclination restricting portions 16 capable of restricting lateral inclination of the cam member 51, the cam member 51 being slidable in contact with the inclination restricting portions 16. According to this configuration, since the inclination of the cam member 51 is restricted by the inclination restricting portions 16, the pressing surfaces 56 properly press the outer side edges of the pair of fastening pieces 36. This causes the fastening pieces 36 to be held properly in close contact with the outer periphery of the battery post P. Thus, operability in connection to the battery post P is excellent.

Further, since the inclination restricting portions 16 are provided to sandwich the cam member 51 from opposite left and right sides, the inclination of the cam member 51 can be reliably restricted. Further, since the inclination restricting portions 16 are formed with the vertical receiving surfaces 17 with which the cam member 51 can slide in contact, the inclination of the cam member 51 can be reliably prevented by causing the cam member 51 to slide in contact with the vertical receiving surface 17. Furthermore, since the cam member 51 is formed with the vertical contact surfaces 57 slidable in contact with the inclination restricting portions 16, the inclination of the cam member 51 can be reliably prevented by causing the vertical contact surfaces 57 to slide in contact with the inclination restricting portion(s) 16.

Further, the cam member 51 is formed with the pair of vertical wall portions 54 slidable in contact with the outer side edges (arcuate surfaces 45) of the pair of fastening pieces 36 and connected to the lower end parts of the pair of pressing surfaces 56. According to this configuration, in the process of displacing the cam member 51 by the fastening members (fastening bolt 58 and nut 61), the vertical wall portions 54 slide in contact with the outer side edges of the pair of fastening pieces 36 before the pair of fastening pieces 36 are pressed by the pressing surfaces 56. In this way, the pressing surfaces 56 press the pair of fastening pieces 36 while being kept in a proper positional relationship.

Further, the battery terminal A of this first embodiment includes the terminal main body 10 and the terminal main body 10 is formed with the left and right fastening pieces 36 deformable to be held in close contact with the outer periphery of the battery post P. The battery terminal A includes the cam member 51 having the left and right pressing surfaces 56 capable of pressing the outer side edges of the pair of fastening pieces 36 and inclined with respect to the axis line of the battery post P. Further, the battery terminal A includes the fastening means 50 for vertically displacing the cam member 51 with the pair of pressing surfaces 56 held in contact with the pair of outer side edges of the fastening pieces 36. The fastening piece 36 is formed with the arcuate surface 45 composed of a curved surface slidable in contact with the pressing surface 56. According to this configuration, since the pressing surface 56 and the fastening piece 36 are held not in surface contact, but in line contact when the pressing surface 56 presses the fastening piece 36, frictional resistance is suppressed low. Therefore, operability in connection to the battery post P is excellent.

Further, the pressure receiving portion 39 constituting the fastening piece 36 includes the base plate 42, the folded portion 43 connected to the outer side edge of the base plate 42 and having the arcuate surface 45, and the reinforcing plate 44 formed by extending the folded portion 43 and placed on the upper surface of the base plate 42. According to this configuration, the fastening piece 36 has a double-plate structure, wherefore the strength of the fastening piece 36 is enhanced. This can prevent the fastening piece 36 from being improperly deformed when being pressed by the pressing surface 56.

Further, the lower member 11 constituting the terminal main body 10 is formed with the supporting plate 18 for supporting the fastening pieces 36 from below and the left and right rotation preventing portions 20 extending down from the left and right outer side edges of the supporting plate 18 and configured such that the base 59 of the fastening bolt 58 constituting the fastening means 50 is fit thereto with the rotation thereof restricted. Furthermore, the lower member 11 is formed with the bulges 21 projecting laterally out from areas of the left and right outer side edges of the supporting plate 18 behind the rotation preventing portions 20 (areas where the rotation preventing portions 20 are not formed) and configured to support the fastening pieces 36 from below. According to this configuration, the fastening pieces 36 can be reliably supported from below by the bulges 21 even if a lateral spacing between the rotation preventing portions 20 facing in the lateral direction is narrow and a lateral dimension of the supporting plate 18 is small.

Furthermore, the fastening piece 36 is cantilevered substantially forward. The bulging portion 21 is arranged substantially at the same position as (in an area substantially corresponding to) the contact position (rear end part of the pressure receiving portion 39) of the fastening piece 36 with the pressing surface 56 of the cam member 51 in the front-back direction. According to this configuration, since the bulge 21 is arranged at a position close to a position of the fastening piece 36 where a pressing force from the cam member 51 is effectively received, the pressing force from the cam member 51 can be effectively received by the bulge 21. Thus, improper deformation of the fastening piece 36 can be prevented.

<Second to Fourth Embodiments>

Figure 16:
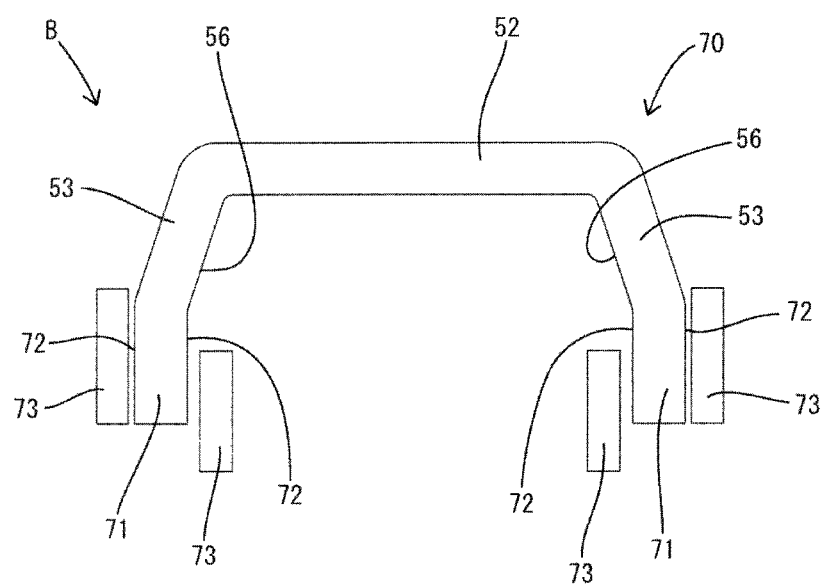
FIG. 16 is a front view showing a cam member and inclination restricting portions in a battery terminal of a second embodiment in a simplified manner.
Figure 17:
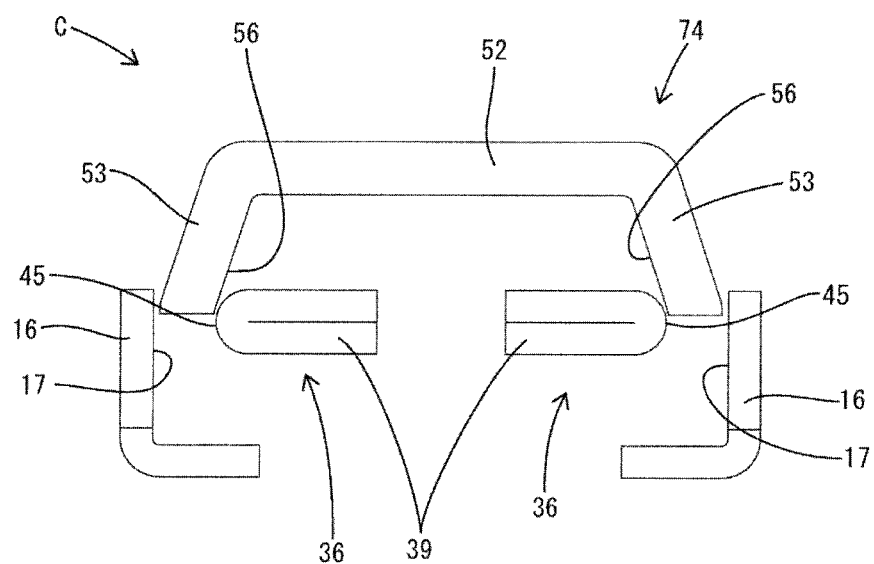
FIG. 17 is a front view showing a cam member and inclination restricting portions in a battery terminal of a third embodiment in a simplified manner.
Figure 18:
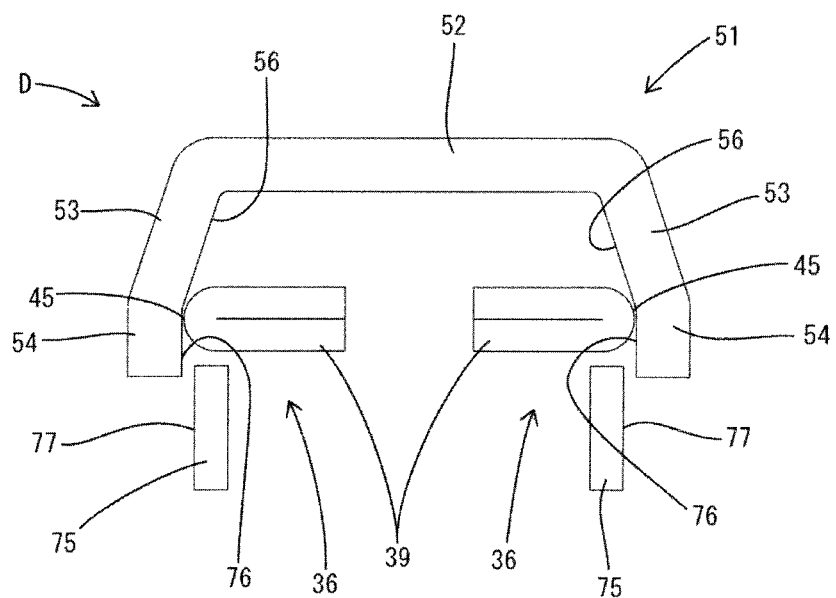
FIG. 18 is a front view showing a cam member and inclination restricting portions in a battery terminal of a fourth embodiment in a simplified manner.

Next, second to fourth specific embodiments of the present invention are described with reference to FIGS. 16 to 18. Note that the substantially same or similar components as in the first embodiment are denoted by the same reference signs and the structures, functions and effects thereof are not described.

A cam member 70 constituting or forming part of a battery terminal B of the second embodiment includes vertical walls 71 extending down longer than in the first embodiment, and both inner and outer side surfaces of the vertical walls 71 serve as vertical contact surfaces 72. Inclination restricting portions 73 are arranged both at positions where they face the vertical contact surfaces 72 on the outer side surfaces while laterally sandwiching the cam member 70 as in the first embodiment and at positions where they substantially face the vertical contact surfaces 72 on the inner side surfaces of the vertical walls 71. That is, since one vertical wall is sandwiched by two inner and outer inclination restricting portions 73, the inclination of the cam member 70 is restricted reliably.

A cam member 74 constituting or forming part of a battery terminal C of the third embodiment does not include parts corresponding to the vertical wall portions 54 of the first embodiment. Thus, the cam member 74 is formed with no vertical contact surface. The posture inclination of the cam member 74 is restricted by causing the lower end edges of both left and right ends of the cam member 74 to slide in contact with vertical receiving surfaces 17 of inclination restricting portions 16. Since the cam member 74 includes no vertical wall portion, a weight reduction and a material cost reduction can be realized.

Inclination restricting portions 75 constituting or forming part of a battery terminal D of the fourth embodiment are arranged not at positions facing the outer surfaces of vertical walls 54 of a cam member 51, but at positions substantially facing the inner surfaces of the vertical walls 54. Thus, the inner surfaces of the vertical walls 54 function as vertical contact surfaces 76. The outer side surfaces of the inclination restricting portions 75 function as vertical receiving surfaces 77.

<Other Embodiments>

The invention is not limited to the above described and illustrated embodiments. For example, the following embodiments are also included in the technical scope of the present invention.

Although the fastening means is composed of the cam member, the bolt and the nut in the above embodiments, the fastening pieces may be deformed to come closer by the bolt and the nut without using the cam member.

Although the conductor connecting portion for connecting the external conductor is provided on the upper member in the above embodiments, it may be provided on the lower member.

Although the supports (supporting plate and pressing portions) formed on the lower member restrict relative displacements of the fastening pieces in both upward and downward directions in the above embodiments, displacements may be restricted in only one of the upward and downward directions by the supports.

Although the lower member is formed with the supports for supporting the fastening pieces in the above embodiments, such supports may not be formed.

Although the fastening piece is formed with the peripheral wall on the above embodiments, it may be formed with no peripheral wall.

Although the peripheral wall projects up from the fastening piece in the above embodiments, it may project down from the fastening piece.

Although the base portion of the fastening bolt is fit to the rotation preventing portions in the above embodiments, the nut may be fit to the rotation preventing portions.

Although the reinforcing plate is placed on the upper surface of the base plate in the above embodiments, it may be placed on the lower surface of the base plate.

Although the fastening piece is formed such the base plate and the reinforcing plate are placed one over the other in the above embodiments, the fastening piece may be composed of a single plate.

Although the supporting plate is formed with the bulges in the above embodiments, it may be formed with no bulge.

Although the base of the fastening bolt is fit to the rotation preventing portions in the above embodiments, the nut may be fit to the rotation preventing portions.

Although the inclination restricting portions are provided on both left and right sides of the cam member in certain embodiments, the inclination restricting portion may be provided only on the left or right side of the cam member.

Although the inclination restricting portions are formed with the vertical receiving surfaces in certain embodiments, the inclination restricting portions may be formed with no vertical receiving surface if the cam member is formed with the vertical contact surfaces.

Although the cam member is formed with the vertical contact surfaces in certain embodiments, the cam member may be formed with no vertical contact surface if the inclination restricting portions are formed with the vertical receiving surfaces.

REFERENCE SIGNS

A, B, C, D . . . battery terminal
P . . . battery post
11 . . . lower member (first member)
15 . . . pressing portion (support)
16, 73, 75 . . . inclination restricting portion
17 . . . vertical receiving surface
18 . . . supporting plate (support)
20 . . . rotation preventing portion
21 . . . bulge
30 . . . upper member (second member)
31 . . . conductor connecting portion
33 . . . external conductor
34 . . . coupling
36 . . . fastening piece
41 . . . peripheral wall
42 . . . base plate
43 . . . folded portion
44 . . . reinforcing plate
45 . . . arcuate surface
50 . . . fastening means
51, 70, 74 . . . cam member
54, 71 . . . vertical wall
56 . . . pressing surface
57, 72 . . . vertical contact surface
58 . . . fastening bolt (fastening member)
61 . . . nut (fastening member)

What is claimed is:

1. A battery terminal, comprising:

a lower member to be fit to a battery post having an axis line while being positioned with respect to the battery post, the lower member extending in forward to backward directions and having a joining portion, an annular portion having a positioning hole fit about the battery post, the annular portion forward of the joining portion, and a supporting plate forward of the annular portion, the supporting plate having a through hole having an axis line parallel to the axis line of the battery post;

an upper member mounted on the lower member, the upper member having a coupling, first and second fastening pieces extending forward from the coupling and including a pair of semicircular arms defining a connection hole therebetween, the connection hole substantially aligned with the annular portion of the lower member and fit about the battery post, and first and second pressure receiving portions forward of the pair of semicircular arms arranged on the supporting plate on opposite sides of the through hole, the first and second pressure receiving portions each including a base plate extending forward from the pair of semicircular arms, a folded portion extending from an outer edge of the base plate in a direction opposite the lower member and substantially normal to the base plate, and a reinforcing plate extending inward from the folded portion, an outer surface of the folded portion defining an arcuate surface, and the arcuate surfaces of the first and second pressure receiving portions facing directions opposite each other and transverse to the forward to backward direction;

a cam member mounted on the pressure receiving portions and having a horizontal portion with an insertion hole aligned with the through hole, and first and second oblique portions extending from the horizontal portion and in contact with the first and second pressure receiving portions; and a fastening means including a bolt extending through the insertion hole and the through hole, and a nut threaded to an end of the bolt for deforming the first and second fastening pieces into close contact with the battery post, wherein the nut is threaded on the bolt to drive the cam member downward, the first and second oblique portions of the cam member sliding on the arcuate surfaces of the first and second pressure receiving portions to deform the first and second fastening pieces inward towards the battery post.

2. The battery terminal of claim 1, wherein the upper member includes a conductor connecting portion for connecting an external conductor.

3. The battery terminal of claim 1, wherein the supporting plate (18) is formed with a rotation preventing portion to which the fastening means is to be fit with rotation restricted.

4. The battery terminal of claim 1, wherein areas of the first and second fastening pieces to be brought into contact with the outer periphery of the battery post are formed with peripheral walls extending substantially along the axis line.

* * * * *